United States Patent [19]

Ishida et al.

[11] Patent Number: 5,202,597
[45] Date of Patent: Apr. 13, 1993

[54] MOTOR WITH DECELERATING APPARATUS

[75] Inventors: Hideki Ishida, Yao; Hiroshi Kusumoto, Wakayama; Hideo Fukuda, Nishinomiya, all of Japan

[73] Assignee: Mita Industrial Co., Ltd., Osaka, Japan

[21] Appl. No.: 772,331

[22] Filed: Oct. 7, 1991

[30] Foreign Application Priority Data

Nov. 16, 1990 [JP] Japan .................. 2-312150

[51] Int. Cl.⁵ ............... H02K 7/116; F16H 3/08
[52] U.S. Cl. ............................ 310/83; 310/99; 74/325
[58] Field of Search ............... 310/83, 99, 80, 89, 310/91; 74/325

[56] References Cited

U.S. PATENT DOCUMENTS

| | | | |
|---|---|---|---|
| 1,898,753 | 2/1933 | Wente | 475/149 |
| 2,050,185 | 8/1936 | Kibler | 310/99 |
| 2,881,626 | 4/1959 | Morris | 74/325 |
| 3,148,556 | 9/1964 | Gibbs et al. | 74/325 |
| 3,153,158 | 10/1964 | Schmitter | 74/325 |
| 4,802,372 | 2/1989 | Harrod et al. | 74/325 |
| 5,067,361 | 11/1991 | Lachenmaier | 74/325 |

FOREIGN PATENT DOCUMENTS

| | | | |
|---|---|---|---|
| 740132 | 7/1932 | France | 74/421 A |
| 53-112365 | 9/1978 | Japan | 74/421 A |
| 58-115452 | 7/1983 | Japan | |

*Primary Examiner*—Steven L. Stephan
*Assistant Examiner*—D. R. Haszko
*Attorney, Agent, or Firm*—Sandler Greenblum & Bernstein

[57] ABSTRACT

A motor with a decelerating apparatus includes a motor, a gear box connected to the motor, a pinion gear attached to an end of an output shaft of the motor, two or more decelerating gears engaging with the pinion gear, a rotation shaft connected to each of the decelerating gears as a unity, a bearing for supporting the rotation shaft of each of the decelerating gears provided in the gear box, and a mounting unit for fixing the gear box to a load, an output terminal of the rotation shaft of each of the decelerating gears being connected to a rotating load, the gear box comprising a bearing for supporting a rotation shaft of a first decelerating gear which engages with the pinion gear and a bearing for supporting a rotation shaft of a second decelerating gear which engages with the pinion gear and is different from the first decelerating gear in the number of teeth, the mounting unit connecting the output terminal of the rotation shaft of either of the first and second decelerating gears to the rotating load, and the gear box selectively having either of the first and second decelerating gears to vary a decelerating rate.

9 Claims, 2 Drawing Sheets

MOTOR WITH DECELERATING APPARATUS

BACKGROUND OF THE INVENTION

1. Field of the Invention

The present invention relates to a motor with a decelerating apparatus employed as driving source primarily for an image formation device.

2. Description of the Prior Art

Conventionally, as this type of motor, an induction motor and a synchronous motor are commercially available. Also, well-known are a motor in which a constant number of revolutions are maintained by varying a decelerating rate of a decelerating apparatus in correspondence with a frequency of a power source to prevent the number of revolutions from being varied depending upon varying frequency of the power source, a motor in which reverse revolutions are caused in response to variations in frequency and either of two decelerating means different in decelerating rate causes deceleration through a one-way clutch to obtain a constant number of revolutions in a fixed direction, and motors that have various other mechanisms (e.g., see Japanese Unexamined Patent Publication No. 115452/1983).

However, such conventional mechanisms to obtain a constant number of revolutions against the variation in frequency of the power source are complicated in structure and necessarily has a large number of components, and consequently, there arises the problem that the manufacturing expenses of the intended motor become high.

SUMMARY OF THE INVENTION

The present invention provides a motor with a decelerating apparatus which includes a motor, a gear box connected to the motor, a pinion gear attached to an end of an output shaft of the motor, two or more decelerating gears engaging with the pinion gear, a rotation shaft connected to each of the decelerating gears as a unity, a bearing for supporting the rotation shaft of each of the decelerating gears provided in the gear box, and a mounting unit for fixing the gear box to a load, an output terminal of the rotation shaft of each of the decelerating gears being connected to a rotating load, the gear box comprising a bearing for supporting a rotation shaft of a first decelerating gear which engages with the pinion gear and a bearing for supporting a rotation shaft of a second decelerating gear which engages with the pinion gear and is different from the first decelerating gear in the number of teeth, the mounting unit connecting the output terminal of the rotation shaft of either of the first and second decelerating gears to the rotating load, and the gear box selectively having either of the first and second decelerating gears to vary a decelerating rate.

Preferably, the gear box can be fixed to the mounting unit each time rotated 90° around a shaft of the motor.

Also preferably, four kinds of decelerating rate can be obtained by the renewal of the decelerating gear.

DETAILED DESCRIPTION OF THE PREFERRED EMBODIMENTS

Now, the present invention will be described in detail in conjunction with the embodiments shown in the accompanying drawings. However, it is not intended that the present invention be limited to the precise form of the description.

Figure 1:
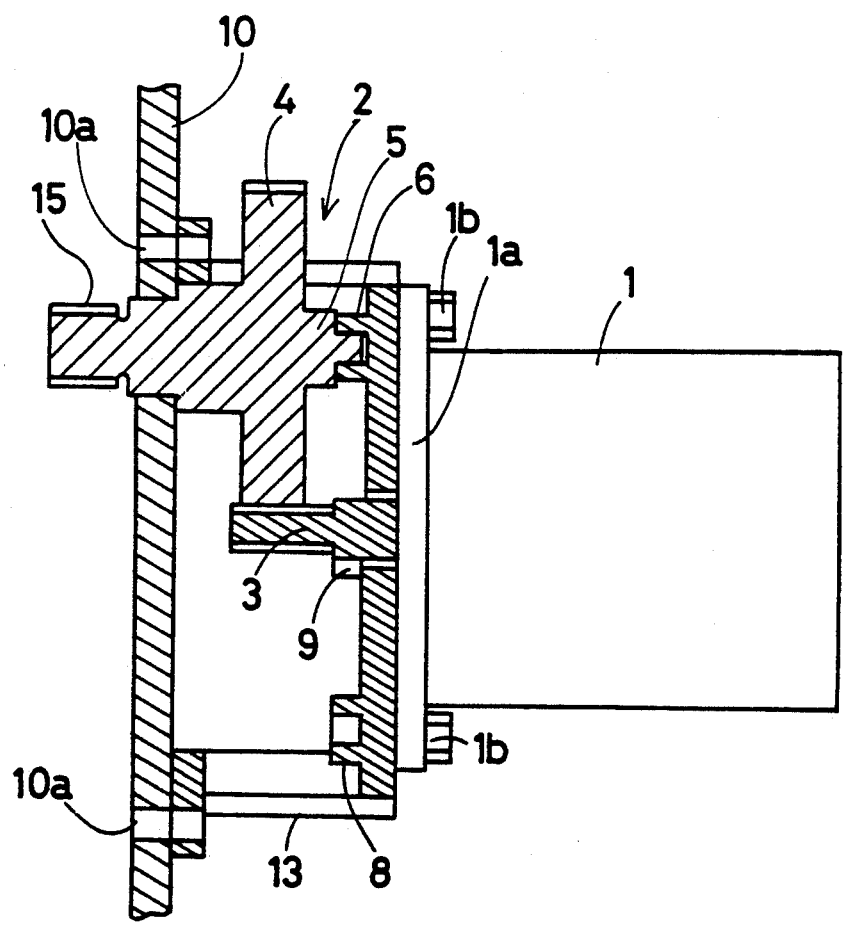
FIG. 1 is a partial sectional side view showing an embodiment according to the present invention.
Figure 2:
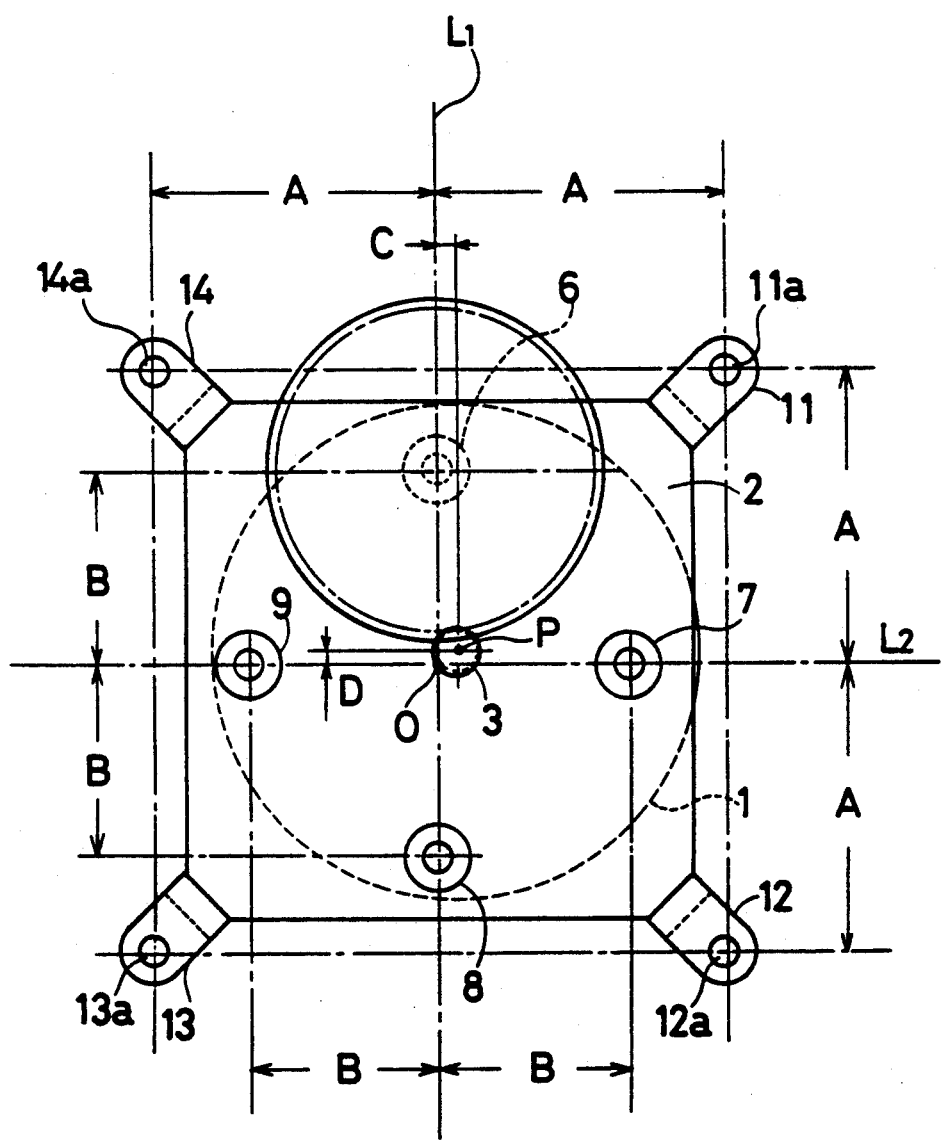
FIG. 2 is an elevational view showing a major portion of FIG. 1.

FIG. 1 is a partial sectional view showing an embodiment according to the present invention, and FIG. 2 is a elevational view showing a major portion of FIG. 1. Referring to these figures, there are provided a motor 1, a gear box 2 connected to the motor 1, a pinion gear 3 mounted on an end of an output shaft of the motor 1, a decelerating gear 4 of composite resin which engages with the pinion gear 3, a rotation shaft 5 cast together with the decelerating gear 4 as a unity, a bearing 6 for supporting one end of the rotation shaft 5, bearings 7, 8, 9 for supporting rotation shafts for replacement decelerating gears, and a gear box mounting plate 10 placed on the side of a load. Furthermore, there are provided feet 11, 12, 13, 14 for fixing the gear box 2 to the mounting plate 10, and a gear 15 connecting to a rotating load (not shown) placed at an output terminal of the rotation shaft 5. Reference numeral 1a denotes a mounting flange for the motor 1, fixed to the gear box 2 by a fixing bolt 1b. There are also provided mounting holes 11a to 14a formed in the feet 11 to 14, respectively, and four mounting holes 10a extending through the mounting plate 10 corresponding to the mounting holes 11a to 14a.

The mounting holes 11a to 14a are, as shown in FIG. 2, formed in the positions an identical distance, or a distance A, away from center lines L1, L2 which pass through the center O seen from the mounting side of the gear box 2 and cross orthogonal to each other. The motor 1 is opposed to the gear box 2, having the shaft center P of the pinion gear 3 positioned a distance C away from the center line L1 and a distance D away from the center line L2.

In this way, connecting the motor 1 and the gear box 2 eccentrically, the pinion gear 3 has different distances from the bearings 6 to 9. If the distances B, C, and D are set to appropriate values, the number of teeth of each decelerating gear which is supported by each of the bearings 6 to 9 and engages with the pinion gear 3 can vary from gear to gear.

On the other hand, since the mounting holes 11a to 14a and the bearings 6 to 9 are disposed as previously mentioned, the gear box 2 can be fixed to the mounting plate 10 anytime rotated by 90° at a time. Even if the decelerating gear 4 is replaced with a another decelerating gear which can fit in any of the bearings 7, 8, and 9 and engage with the pinion gear 3, the renewal decelerating gear can be connected to the rotating load, similar to the decelerating gear 4. Thus, there can be four kinds of decelerating rate because of the replacement of the decelerating gear.

Exemplary numerical values can be determined as follows: Under the conditions that $A=45$ mm, $B=30$ mm, $C=3$ mm, $D=2$ mm, the number Z of teeth of the pinion gear 3 equals 12, and a module M equals 0.5, (1) the number of teeth of the decelerating gear attachable to the bearing 6, $Z=100$ $(M=0.5)$;

(2) the number of teeth of the decelerating gear attachable to the bearing 7, $Z=96$ $(M=0.5)$;

(3) the number of teeth of the decelerating gear attachable to the bearing 8, $Z=116$ $(M=0.5)$; and (4) the number of teeth of the decelerating gear attachable to the bearing 9, Z=120 (M=0.5).

Decelerating rates corresponding to them are as follows:

In the case of (1), 100:12;
in the case of (2), 96:12;
in the case of (3), 116:12; and
in the case of (4), 120:12.

Thus, when the rotation speed of the motor 1 varies because of the variation in frequency and characteristic, the number of revolutions transmitted to the load can remain the same or in a specified range by the replacement of the decelerating gear 4 alone with the corresponding decelerating gear.

In accordance with the present invention, there can be provided a motor with a decelerating apparatus which can output a constant number of revolutions by the renewal of the minimum number of parts even if the rotation speed of the motor varies because of factors such as a frequency of a power source and the like.

What is claimed is:

1. A decelerating apparatus for a motor with an output shaft, comprising:
    a pinion gear mounted on the output shaft of the motor;
    a plurality of decelerating gears for selectively engaging with said pinion gear, each of said decelerating gears being integrally formed with a rotation shaft;
    means for supporting each of said decelerating gears, said supporting means comprising a plurality of selectively usable bearings; and
    means for connecting the decelerating apparatus to a load, wherein an output end of said rotation shaft of each of said decelerating gears is selectively connectable to a rotating load.

2. A decelerating apparatus for a motor according to claim 1, wherein each of said decelerating gears further includes disparate number of teeth formed about an outer periphery, whereby a distinct decelerating rate is provided by each of said decelerating gears.

3. A decelerating apparatus for a motor according to claim 1, wherein said supporting means further comprises a gear box detachably attached to the motor and said connecting means comprises a mounting plate detachably attached to said gear box.

4. A decelerating apparatus for a motor according to claim 3, wherein said gear box is attachable to said mounting plate at 90° interval positions about the output shaft of the motor.

5. A decelerating apparatus according to claim 3, wherein said gearbox comprises a plurality of mounting feet that are equally spaced from the center of said gear box, and said mounting plate includes a plurality of mounting holes which correspond to said mounting feet for detachably attaching said gear box to said mounting plate.

6. A motor decelerating apparatus, comprising:
    a gear box connected to a motor;
    a pinion gear attached to an end of an output shaft of the motor;
    a plurality of decelerating gears for selectively engaging with said pinion gear, each of said plurality of decelerating gears being integrally formed with a rotation shaft;
    a plurality of selectively usable bearings for supporting said rotation shaft of each of said decelerating gears provided in said gear box; and
    a mounting unit for fixing said gear box to a load, wherein an output terminal of said rotation shaft of each of said decelerating gears is selectively connected to a rotating load, said mounting unit connecting said output terminal of said rotation shaft of one of decelerating gears to the rotating load, and said gear box being selectively provided with one of said decelerating gears to vary a decelerating rate.

7. A motor decelerating apparatus according to claim 6, wherein said gear box is fixable to said mounting unit at 90° interval positions about said output shaft of the motor.

8. A motor decelerating apparatus according to claim 7, wherein each of said decelerating gears further includes a different number of teeth formed about an outer periphery and provide different decelerating rates.

9. A motor decelerating apparatus according to claim 6, wherein said gear box comprises a plurality of mounting feet that are equally spaced from the center of said gear box, and said mounting unit comprises a mounting plate including a plurality of mounting holes which correspond to said mounting feet for mounting said gear box to said mounting plate.

* * * * *